United States Patent [19]

Burrows

[11] 3,793,040

[45] Feb. 19, 1974

[54] REFRACTORY CEMENT
[75] Inventor: Owen M. Burrows, Holden, Mass.
[73] Assignee: Norton Company, Worcester, Mass.
[22] Filed: Jan. 28, 1972
[21] Appl. No.: 221,776

Related U.S. Application Data
[63] Continuation-in-part of Ser. No. 28,011, April 13, 1970, abandoned.

[52] U.S. Cl.................. 106/55, 106/57, 106/58, 106/65
[51] Int. Cl.. C04b 35/04, C04b 35/10, C04b 35/48
[58] Field of Search .................... 106/55, 57, 58, 65

[56] References Cited
UNITED STATES PATENTS
2,429,872  10/1947  Downs ................................ 106/57

*Primary Examiner*—James E. Poer
*Attorney, Agent, or Firm*—Rufus M. Franklin

[57] ABSTRACT

A loose granular mix for producing heat-refractory linings for furnaces is based on an aggregate of refractory oxide loose grains of mixed sizes such as fused alumina having a stable fused glassy coating bonded to the surfaces of individual grains, and includes at least 5 percent by volume of material finer than 30 microns.

Uncoated aggregate, and materials such as clay, magnesia, and flint may be included to produce desired properties of the mix and of the ultimate heat matured product.

5 Claims, No Drawings

REFRACTORY CEMENT

RELATION TO EARLIER APPLICATION

This application is a continuation-in-part of application Ser. No. 28,011, filed Apr. 13, 1970 now abandoned.

BACKGROUND OF THE INVENTION

This invention relates to loose granular refractory mixes both wet and dry for producing fired-in-place refractory linings such as for metal melting furnaces.

Highly refractory linings for various commercial applications such as metal melting furnaces must, in many instances be fabricated in place in the furnace. Refractory mixes are commercially available consisting of loose refractory oxide aggregate and bond. Such mixes, dry, or mixed with water are tamped in place and the bond is matured by operation of the furnace to produce a sintered monolithic lining. A major cause of eventual failure of such linings is penetration of metal or slag into the pores of the lining. It is therefore an object of this invention to provide a refractory cement mixture which will cure to a highly dense structure free of large pores susceptible to penetration by slag or molten metal contained in the furnace.

DESCRIPTION OF THE PREFERRED EMBODIMENTS

The refractory mix of the invention is characterized by including as at least a substantial portion of the aggregate material, a coarse crystalline fused refractory metal oxide of mixed sizes having a fused stable glass coating thereon. Although fused alumina grit, having a grit size of from about 100 microns to 6000 microns (about 6 to 150 grit), is the generally preferred aggregate material, for some applications other fused or highly sintered oxides or combinations of oxides such as MgO, MgO $Al_2O_3$, $ZrO_2$, $3Al_2O_3$ $2SiO_2$, can be employed.

The mix consists of the coated aggregate in a graded mixture of sizes to achieve maximum density (minimum porosity) of the fired lining, plus uncoated aggregate and includes at least 5 percent of refractory oxide having a particle size of 30 microns and finer; and it may include plasticizers such as clay for use where a wet mix is desired, and chemical additives to aid in the sintering process and/or react with the aggregate to produce crystalline compounds of lower specific gravity, thus producing volume growth in the body to maximize elimination of porosity. The total glass coating content in the mix should be between 2 and 15 percent by volume of total solids. The employment of graded sizes of refractory oxide is important in providing maximum porosity of the tamped mix of 30 percent or less.

In the case of alumina aggregate such chemical additives include clay and silica, which may desirably be in the form of ground flint. The silica in the flint or clay will react on firing to produce mullite. Another useful additive is magnesia, preferably calcined or fused, relatively coarse (capable of passing a 100 mesh screen, but not an impalpable powder). Magnesia, upon firing with alumina, will form spinel, to prevent shrinkage.

Plasticizers such as clay, or organic plasticizers such as starch or methyl cellulose may be employed if it is desired to employ a wet mix. Although the use of organic plasticizers tends to induce porosity in the mix, the beneficial effect of the use of glass coated aggregate inherently produces a fired body of low porosity as compared to the use of conventional mixes.

The following is an example of a mix to which water may be added by the user.

Example I

| Ingredient | Particle Size | % By Wt. |
|---|---|---|
| Standard Fused alumina (95% $Al_2O_3$) | 1500 to 6000 microns (6 to 16 grit) | 40% |
| Standard Fused alumina with stable glass coating fused on surface (4% by wt.) | 200 – 1000 microns (24 to 90 grit) | 30% |
| Fused High purity (99% $Al_2O_3$) alumina, glass coated (11% by wt.) | 150 microns and finer (through 100 mesh) | 15% |
| Alumina fines | 320 mesh and finer (30 microns and finer) | 10% |
| Potter's Flint | 200 mesh and finer (70 microns and finer) | 5% |

The fused glass coating in the above example can be any conventional stable glass made from slag and other minerals and chemical additives conventional in the glass-making art. A typical analysis for such glass is as follows:

| Oxide | Wt.% |
|---|---|
| $SiO_2$ | 52 |
| $Al_2O_3$ | 20 |
| $Fe_2O_3$ | 1 |
| MgO | 3 |
| CaO | 3 |
| $Na_2O$ | 6 |
| $K_2O$ | 4 |
| $TiO_2$ | 1 |
| $B_2O_3$ | 10 |

The individual coated grit can have typically from 1 to 15 wt. percent of coating and can be formed by coating the glass forming mix, or a prepared powdered grit, on the refractory grains and firing the coated grits to cone 12 or higher, (about 1300°C) depending upon the particular glass composition. The resulting product is then broken-up to separate the grains, if necessary and employed in the above described mix. The amount of breaking up necessary can be minimized by firing the grains in a rotary kiln.

The above example is merely exemplary and considerable variation is possible. It is not necessary to employ high purity alumina, and the use of flint is optional, as previously explained.

It should be noted that not all of the grit is coated. It has been found that preferred results are achieved when at least the major portion of the glass in the mix is present on grits in the range of 100 to 200 microns in size (as coated). We prefer that at least 15 percent of the mix consist of uncoated refractory oxide particles. The total glass content of the mix should generally not exceed 15 percent by volume, to preserve the refractory nature of the product and should not be less than 2 percent to preserve the strength and low porosity of the fired body.

When clay is employed to plasticize a wet mix, the raw clay content should not exceed 40 percent, by weight of the mix. Potentially reactive materials for producing growth are effective when employed in the range of from 1 percent to 20 percent, by volume.

What is claimed is:

1. A dry refractory mix for firing in place to produce a furnace lining comprising an aggregate of graded sizes of refractory oxide grains having a coating of a vitrified stable glass bonded to the surface of individual grains thereof, and at least 10 percent by volume of refractory oxide particles 30 microns in size and finer, the total glass content of the mix being from 2 to 15 percent by volume, and the porosity of the mix, tamped, being less than 30 percent by volume.

2. A mix as in claim 1 containing at least 15 percent by volume, of total solids, of refractory oxide particles free of glass coating.

3. A mix as in claim 1 in which the refractory oxide is alumina.

4. A mix as in claim 1 in which the refractory oxide is zirconia.

5. A mix as in claim 1 in which the refractory oxide is selected from the group consisting of alumina, magnesia, zirconia and mixtures thereof.

* * * * *